United States Patent
Rakauskas

(10) Patent No.: US 6,685,197 B1
(45) Date of Patent: Feb. 3, 2004

(54) SILICONE RUBBER GASKET WITH PERFORATED METAL CORE AND METHOD

(75) Inventor: Paul V. Rakauskas, Melrose Park, IL (US)

(73) Assignee: Dana Corporation, Toledo, OH (US)

( * ) Notice: Subject to any disclaimer, the term of this patent is extended or adjusted under 35 U.S.C. 154(b) by 81 days.

(21) Appl. No.: 10/004,358

(22) Filed: Oct. 31, 2001

(51) Int. Cl.$^7$ ................................................ F16J 15/08
(52) U.S. Cl. .................... 277/651; 277/592; 277/593; 277/611; 277/638; 277/640
(58) Field of Search ................ 277/591, 592, 277/593, 611, 627, 628, 638, 640, 651

(56) References Cited

U.S. PATENT DOCUMENTS

| | | | |
|---|---|---|---|
| 1,927,450 A | | 9/1933 | Balfe |
| 2,055,471 A | | 9/1936 | Balfe |
| 3,930,656 A | | 1/1976 | Jelinek |
| 3,970,322 A | * | 7/1976 | Stecher et al. ............ 277/592 |
| 5,275,420 A | * | 1/1994 | Rodenkirch ............... 277/313 |
| 5,362,074 A | * | 11/1994 | Gallo et al. .............. 277/592 |
| 5,540,452 A | | 7/1996 | Belter |
| 5,639,103 A | * | 6/1997 | Jeanne et al. ............. 277/596 |
| 5,788,247 A | * | 8/1998 | Tensor .................... 277/591 |
| 5,958,571 A | * | 9/1999 | Omura .................... 428/316.6 |
| 6,113,109 A | * | 9/2000 | Lieb et al. ............... 277/590 |

* cited by examiner

Primary Examiner—Anthony Knight
Assistant Examiner—Enoch E Peavey
(74) Attorney, Agent, or Firm—Rader, Fishman & Grauer, PLLC

(57) ABSTRACT

A valve cover gasket has a perforated central core of metal including protrusions extending from planar sides of the core. Silk screened on each side of the core is a silicone foam rubber layer adapted to replace traditional cork gasket structures used for same purpose. The silicone rubber layers include a foaming agent that causes the material to expand during an oven-curing period. The amount of expansion of the silicone rubber coating is up to three times the thickness of the coating originally applied. As disclosed, the oven cure is for approximately 10 minutes at 300 degrees Fahrenheit. The protrusions prevent the silicone rubber material from being fully compressed; the protrusions are designed not to flatten under normal gasket compression loads. The peaks of the protrusions act as compression loads stops to limit amount of permissible compression of the silicone rubber layers.

14 Claims, 2 Drawing Sheets

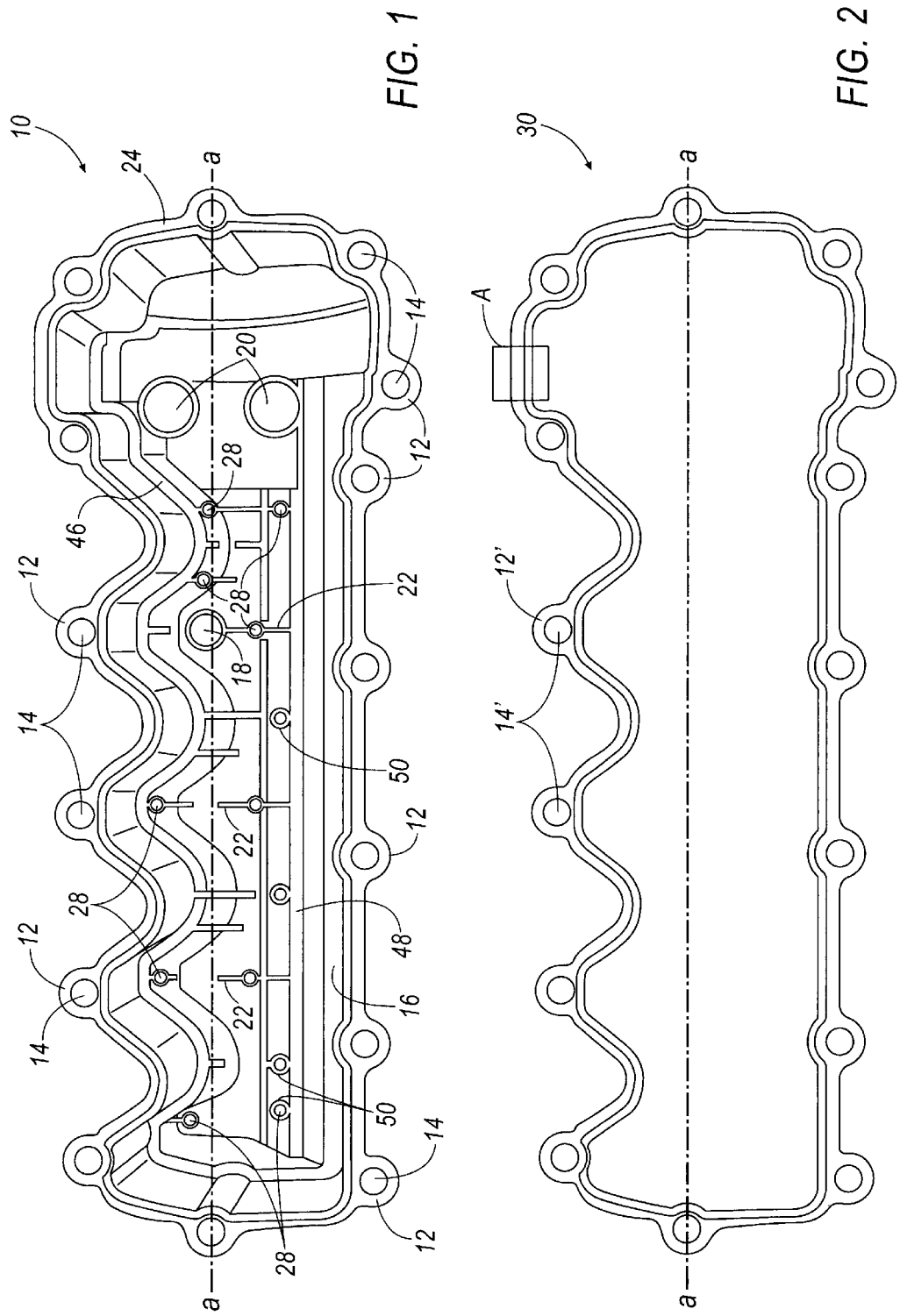

SILICONE RUBBER GASKET WITH PERFORATED METAL CORE AND METHOD

BACKGROUND OF THE INVENTION

1. Field of Invention

This invention relates generally to improvements in designs of gaskets for certain automotive applications. More particularly, the invention relates to improvements in the manufacture of gaskets for a variety of non-combustion sealing gaskets for applications ranging from valve cover, oil pan, and engine water coolant gaskets for thermostats to plenum gaskets for air intake manifolds.

2. Description of the Prior Art

Planar-style gaskets employed in the automotive arena for non-combustion applications including oil pans and valve covers have traditionally been formed of cork materials, wherein the cork materials have often been reinforced with metallic cores to facilitate handling of the gaskets. Such gaskets have been relatively labor-intensive to manufacture, and have not been as effective for sealing as desired, particularly under the rigorous pressure and high temperature demands of modern engines.

In some cases, the cork materials have been bonded to the metallic cores, and adhesive agents employed in the bonding processes have been less than satisfactory, occasionally becoming detached even prior to installation. In other cases, the cork materials have been unable to maintain adequate sealing qualities, and hence to meet requisite longevity targets under the harsh conditions and environments to and in which the gaskets are subjected.

In relatively recent times, prices of cork materials have increased significantly. In addition, the automotive industry has developed a perception that superior sealing results are achieved via uses of silicone rubbers. Moreover, materials that can be applied by silk screening techniques are associated with processes that are considerably less labor-intensive than the bonding and gluing processes associated with applications involving cork materials.

A gasket with improved sealing capability is needed particularly for automotive oil pan and valve cover applications; one employing improved sealing materials, and one involving less labor-intensive manufacturing processes.

SUMMARY OF THE INVENTION

The present invention offers an improved gasket for automotive non-combustion applications including valve cover and oil pan, as well as engine water coolant gaskets. A novel method of manufacturing the improved gasket is also disclosed. The gasket includes a perforated central planar core of metal sandwiched between two layers of a silicone foam rubber adapted to replace traditional cork gasket structures used for the same purpose. The gasket includes tangs or protrusions that extend from planar sides of the metallic core. As disclosed, the silicone rubber layers are applied as a silk-screened coating to both sides of the core, and the coating material employed includes a foaming agent that causes the material to expand during a subsequent oven-curing period.

The amount of heat-induced expansion of the silicone rubber layers is at least three times the original thickness of the as-applied coating. As disclosed, the oven cure takes place for approximately 10 minutes at 300 degrees Fahrenheit. The protrusions prevent the silicone rubber layers from being fully compressed during subsequent actual use of the gasket. The core is thus designed not to flatten out under normal gasket compression loads, as the peaks (i.e., extremities) of the protrusions act as compression loads stops to limit amount of permissible compression of the silicone rubber layers. The silicone rubber layers offer enhanced sealing effectiveness over traditional cork material facings.

BRIEF DESCRIPTION OF THE DRAWINGS

FIG. 1 is a plan view of an interior of a cam cover adapted to receive a silicone rubber gasket with a perforated metallic core along its a circumferential boundary edge in accordance with one disclosed embodiment of the present invention.

FIG. 2 is a plan view of one embodiment of a silicone rubber gasket having a perforated metallic core for use with the cam cover of FIG. 1.

DETAILED DESCRIPTION OF THE EMBODIMENTS

Figure 3:
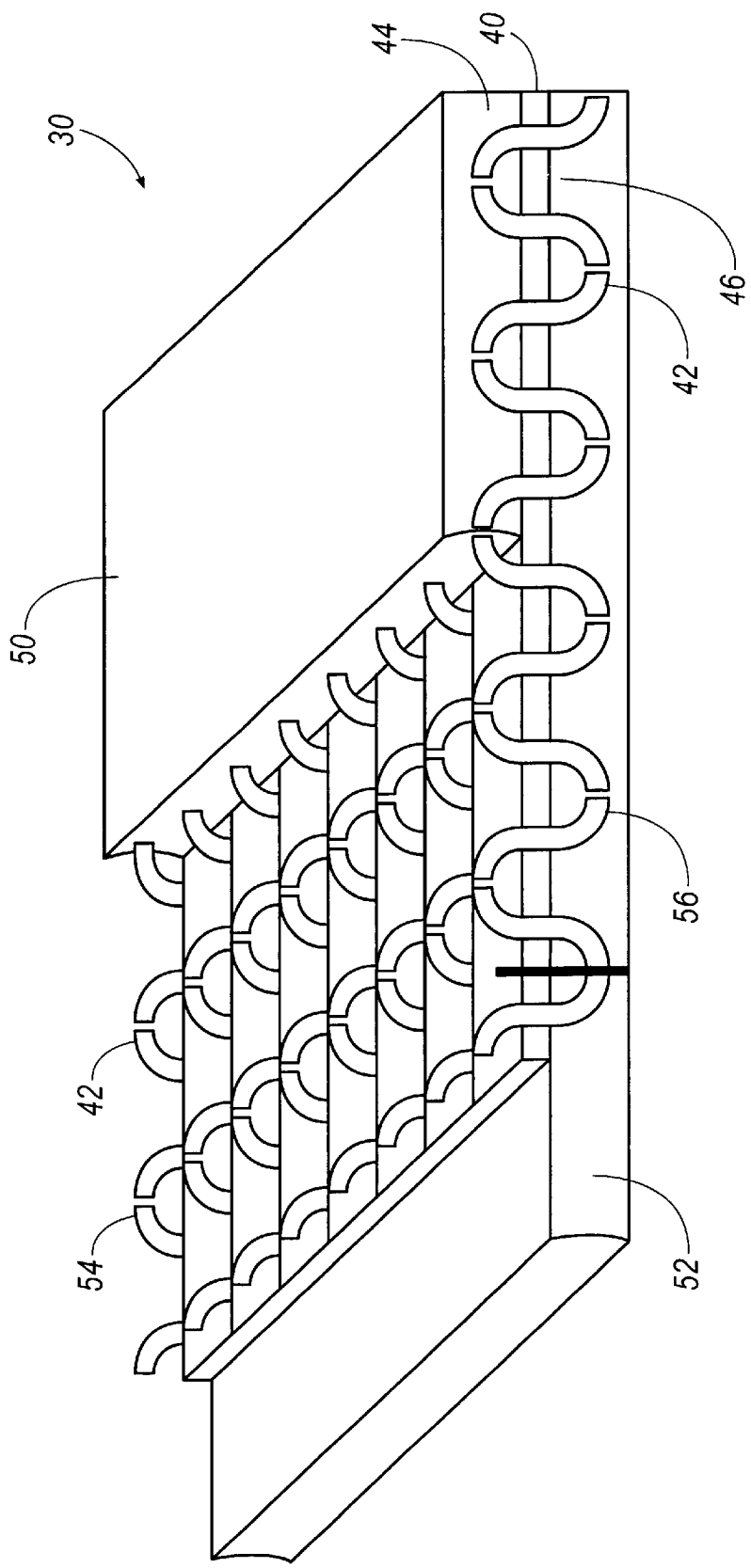
FIG. 3 is combination perspective and partial cross-sectional side view of a sectional portion of the silicone rubber gasket with perforated metallic core of FIG. 2, shown modified to reveal construction details associated with the various layers.

Referring to FIG. 1, a motor vehicle engine cam (valve) cover 10 is adapted to be securely attached to a cylinder head (not shown). Such cam covers have been traditionally made of stamped steel, but in recent years have also been made of molded plastic, cast aluminum, or cast magnesium materials. The cam cover 10 of FIG. 1 is formed of cast magnesium, and has a longitudinal dimension that extends along an axis a-a, as shown.

The cam cover 10 includes a plurality of bosses 12 for attachment of the cover 10 to the cylinder head of the engine. The bosses 12 include apertures 14, which permit passage of bolts that are used to secure the cam cover 10 to the cylinder head. The cam cover 10 comprises an interior 16 that includes a positive crankcase ventilation (PCV) aperture 18, which allows crankcase gases to vent through the cam cover 10 during engine operation.

The cover 10 incorporates other apertures 20, which may accommodate additional engine hardware, including cam phasers and similar electronic devices. The cam cover 10 also includes ribs 22 that extend laterally (i.e. transversely to the axis a-a) across sections of the interior 16 of the cam cover 10. In addition to providing structural support, the ribs 22 create turbulence within a channel defined by a baffle (not shown) and the interior 16 of the cover 10.

Referring now also to FIG. 2, a cam and valve cover gasket 30 is adapted to sealingly engage the circumferential boundary 24 of the cover 10 to seal between the cover 10 and a cylinder head (not shown). In the embodiment disclosed, the gasket can be described as a planar boundary gasket, having two essentially parallel faces that extend axially and in alignment with axis a-a.

Referring now to FIG. 3, which represents an enlarged portion of the inset A of FIG. 2, the gasket 30 comprises a perforated metallic core 40. The core 40 is preferably made of steel material, and includes a plurality of regularly spaced tangs or protrusions 42 that extend orthogonally in both directions from upper and lower planar surfaces 44, 46 of the core 40. The protrusions are formed in the core 40 via either a punching press or by progressive dies.

Upper and lower layers 50, 52 of foam rubber silicone form the actual sealing layers of the gasket 30. The sealing layers 50, 52 are comprised of a resilient pre-cured rubber silicone material (e.g., closed cell material) that is silk screened over both surfaces 44 and 46 of the perforated core 40. The consistency of the applied rubber silicone coating in the described embodiment is as a liquid paste.

Precursors or components of the foam material include one or more cross-linkable polymers, a curing agent, and a blowing agent that generates gas when activated (e.g., heated). The layers 50, 52 may also include particulate fillers, antioxidants, plasticizers, curing co-agents, activators and catalysts, cure inhibitors, and the like. A cross-linkable polymer may be one of several common elastomeric materials used in viscoelastic adhesives, as will be appreciated by those skilled in the art.

After the silk screening of the core 40 as described, the resultant work-in-progress product is oven cured. Following the oven cure, which ideally takes place for approximately 10 minutes at 300 degrees Fahrenheit, the foam rubber silicone material should be resistant to engine oil and should adhere to the core 40 at temperatures encountered in engines. Typically, the foam material will exhibit at least about fifty percent compression at low stress levels (e.g., about 100 psi).

As earlier suggested, the silicone rubber layers 50, 52 will expand during the oven cure stage of manufacture. Particularly useful cross-linkable polymers include acrylonitrile butadiene rubber, and mixtures of acrylonitrile butadiene rubber and epoxy resin, which may be cross-linked using conventional curing agents. Any blowing agent may be used as long as it is compatible with the cross-linkable polymer. Suitable blowing agents include microspheres that expand upon heating and are available under the trade name EXPANCEL from EXPANCEL Inc. Other useful blowing agents include activated azodicarbonamide materials, which are available under the trade name CELOGEN from UNIROYAL CHEMICAL.

Prior to application, precursors of the layers 50, 52 are blended together and applied to the metallic core 40 of the gasket 30 using screen printing. Depending on the viscosity of the components, the screen mesh size may range from about 120 mesh to about forty mesh, though in many cases the mesh size may range from about sixty mesh to about forty mesh. Prior to foaming and curing, the layers 50, 52 may each have a thickness ranging from about 0.05 mm to about 1 mm and between about 0.3 mm and about 2.5 mm when expanded (foamed). In many cases the foamed thickness of each layer may be in a range from about 0.3 mm to about 2.5 mm.

EXAMPLE

A gasket 30 was made by screen-printing foam rubber silicone layers 50, 52 on a steel perforated core 40. The layers 50, 52 comprised a silicone rubber, which was obtained from WACKER SILICONES of Adrian, Mich. under the designation ER93018. The silicone rubber included a major portion of polydimethylsiloxane, a minor portion (about one wt. % to about five wt. %) of trimethoxy [3-(oxiranylmethoxy)propyl]-silane, an organoplatinum curing catalyst, a cure inhibitor, and expandable microspheres (blowing agent). The silicone rubber was screen printed on the steel perforated core 40 to a nominal thickness of 0.25 mm using a THIEME Model No. 1020 screen printer and a 60-mesh screen. The layers 50, 52 were cured in a convection oven for ten minutes at about 149° C. or approximately 300 degrees Fahrenheit. After cure, the resulting foam silicone rubber layers each had a thickness of about 1.5 mm.

Those skilled in the art will appreciate that the tangs or protrusions 42 act to prevent the silicone rubber layers 50, 52 from being fully compressed. Thus, the tangs 42 of the core 40 are designed so as not to flatten out under normal compression loads to which the gasket 30 is subjected. The peaks or upper and lower extremities 54, 56 of the tangs 42 act as compression load stoppers, and limit the amount of permissible compression of the silicone rubber foam layers. The silicone foam rubber facings thereby offer enhanced sealing effectiveness over traditional cork material facings.

It is to be understood that the above description is intended to be illustrative and not limiting. Many embodiments will be apparent to those skilled in the art upon reading the above description. The scope of the invention should be determined, however, not with reference to the above description, but with reference to the appended claims with the full scope of equivalents to which the claims are entitled.

What is claimed is:

1. A gasket adapted for sealing between two mated surfaces, said gasket comprising a metallic central core defining two substantially planar sides; said core defining tangs extending generally orthogonally from at least one planar side thereof, said gasket further comprising a rubber coating applied in a first thickness to at least one of said planar sides, said coating including a foaming agent to cause the coating material to expand during an oven curing period, wherein said tangs prevent the foam rubber material from being fully compressed between said mated planar surfaces to be sealed; and wherein said tangs will not become flattened under normal compression loads of sealing between said mated planar surfaces.

2. The gasket of claim 1 wherein said gasket comprises a valve cover gasket.

3. The gasket of claim 1 wherein said metallic core is comprised of a steel material.

4. The gasket of claim 1 wherein said foam rubber is silk-screened to said metallic core.

5. The gasket of claim 1 wherein said tangs limit the amount of permissible compression of the foam rubber layer, and thus act as compression load stop limiters.

6. The gasket of claim 5 wherein said gasket comprises tangs extending generally orthogonally from both planar sides of said metallic core, and wherein said core is perforated.

7. The gasket of claim 6 wherein said gasket comprises a foam rubber coating applied to both planar sides of said metallic core to define separate foam rubber layers sandwiching said metallic core therebetween.

8. The gasket of claim 1 wherein said foam rubber is a silicone foam rubber material.

9. The gasket of claim 8 wherein said metallic core is comprised of a steel material, and wherein said silicone foam rubber is silk screened to said metallic core.

10. A method of making a gasket for a non-combustion engine application comprising the steps of:

a) providing a metallic core having a generally planar body defining two planar sides, each side having tangs that extend generally orthogonally therefrom and limit the amount of permissible compression of the silicone rubber layers, thereby acting as compression load stop limiters;

b) silk-screening a pre-cured silicone rubber paste material to both planar sides of said core to form a work in process; and c) oven curing said work in process at approximately ten minutes under a temperature of approximately 300 degrees Fahrenheit to form cured silicone rubber layers on said metallic core.

11. The method of claim 10 wherein said metallic core is comprised of a steel material.

12. The method of claim 11 wherein said tangs include a rounded, non-barbed compression peak.

13. The gasket of claim 1, wherein said tangs include a rounded, non-barbed compression peak.

14. A valve cover gasket adapted for sealing between two mated surfaces, said valve cover gasket comprising:

a perforated steel core defining two substantially planar sides;

a plurality of rounded, non-barbed tangs including a compression peak extending generally orthogonally from opposing planar sides of the perforated steel core;

a silk-screened silicon foam rubber coating applied in a first thickness to the opposing planar sides to define separate foam rubber layers sandwiching said perforated steel core therebetween, wherein said tangs are compression load stop limiters that limit the amount of permissible compression of the silicon foam rubber layer between said mated planar surfaces to be sealed; and wherein said tangs will not become flattened under normal compression loads of sealing between said mated planar surfaces.

* * * * *

UNITED STATES PATENT AND TRADEMARK OFFICE
CERTIFICATE OF CORRECTION

PATENT NO.    : 6,685,197 B1
DATED         : February 3, 2004
INVENTOR(S)   : Paul V. Rakauskas It is certified that error appears in the above-identified patent and that said Letters Patent is hereby corrected as shown below:

Column 4,
Line 40, please change "1" to -- 13 --.

Signed and Sealed this

Eleventh Day of May, 2004

JON W. DUDAS
*Acting Director of the United States Patent and Trademark Office*